(12) United States Patent
Bao et al.

(10) Patent No.: US 11,974,335 B2
(45) Date of Patent: Apr. 30, 2024

(54) SIDELINK POSITIONING REFERENCE SIGNAL CONFIGURATION

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 17/124,903

(22) Filed: Dec. 17, 2020

(65) Prior Publication Data

US 2022/0201774 A1 Jun. 23, 2022

(51) Int. Cl.
*H04W 76/10* (2018.01)
*H04L 5/00* (2006.01)
(Continued)

(52) U.S. Cl.
CPC ........... *H04W 76/10* (2018.02); *H04L 5/0048* (2013.01); *H04W 72/56* (2023.01); *H04W 92/18* (2013.01)

(58) Field of Classification Search
CPC ..... H04W 76/10; H04W 72/10; H04W 92/18; H04W 72/1268; H04W 36/16;
(Continued)

(56) References Cited

U.S. PATENT DOCUMENTS

2014/0349582 A1* 11/2014 Xiao ................... G01S 5/10
455/67.11
2021/0136527 A1* 5/2021 Tadayon ............... H04W 4/023
(Continued)

FOREIGN PATENT DOCUMENTS

IN 201917023818 A * 8/2019 .......... G01S 5/0236
JP 2022550882 A * 10/2019
(Continued)

OTHER PUBLICATIONS

Huawei, et al., "Discussion of Sidelink Positioning", 3GPP TSG RAN WG1 #101-e, R1-2004609, 3rd Generation Partnership Project, Mobile Competence Centre, 650, Route Des Lucioles, F-06921 Sophia-Antipolis Cedex, France, vol. RAN WG1, No. E-meeting, May 25, 2020-Jun. 5, 2020, 5 Pages, May 16, 2020, XP051886325.
(Continued)

*Primary Examiner* — Ayaz R Sheikh
*Assistant Examiner* — Louis Samara
(74) *Attorney, Agent, or Firm* — Sunstein LLP

(57) ABSTRACT

A first user equipment includes: an interface configured to send and receive signals wirelessly; and a processor configured to: establish a sidelink connection with a second user equipment; exchange, using the sidelink connection, sidelink information with the second user equipment to at least one of: transmit, via the interface to the second user equipment, first SL PRS-related data (sidelink positioning reference signal related data) including at least one of first SL PRS assistance data or first SL PRS configuration data; or receive, via the interface from the second user equipment, second SL PRS-related data including at least one of second SL PRS assistance data or second SL PRS configuration data; and exchange, via the interface with the second user equipment using the sidelink connection, one or more sidelink positioning reference signals in accordance with at least one of the first SL PRS-related data or the second SL PRS-related data.

33 Claims, 8 Drawing Sheets

(51) Int. Cl.
*H04W 72/56* (2023.01)
*H04W 92/18* (2009.01)

(58) Field of Classification Search
CPC ..... H04W 72/06; H04W 48/16; H04W 72/51;
H04W 88/04; H04L 5/0048; H04L 1/08;
H04L 5/0053; H04L 5/0012; G01S
5/0072; G01S 5/10
See application file for complete search history.

(56) References Cited

U.S. PATENT DOCUMENTS

| | | | | |
|---|---|---|---|---|
| 2021/0160712 A1* | 5/2021 | Tadayon | ............... | H04L 1/0003 |
| 2021/0184812 A1* | 6/2021 | MolavianJazi | ....... | H04L 1/0041 |
| 2021/0185632 A1* | 6/2021 | Manolakos | ........... | H04L 5/0094 |
| 2021/0219268 A1* | 7/2021 | Li | ......................... | H04W 72/20 |
| 2021/0235471 A1* | 7/2021 | Osawa | ................. | H04W 72/20 |
| 2022/0166575 A1* | 5/2022 | Yerramalli | ........ | H04W 72/0453 |
| 2022/0174655 A1* | 6/2022 | Tsai | ...................... | H04W 72/20 |
| 2022/0201774 A1* | 6/2022 | Bao | ...................... | H04L 5/0048 |
| 2022/0236365 A1 | 7/2022 | Ko et al. | | |
| 2022/0369164 A1* | 11/2022 | Hu | ......................... | H04W 88/04 |
| 2022/0416976 A1* | 12/2022 | Baek | .................... | H04W 72/51 |

FOREIGN PATENT DOCUMENTS

| | | | | |
|---|---|---|---|---|
| WO | 2016048509 A1 | 3/2016 | | |
| WO | 2016048510 A1 | 3/2016 | | |
| WO | 2017196510 A1 | 11/2017 | | |
| WO | WO-2021112610 A1 * | 6/2021 | ............... | H04L 1/08 |
| WO | 2021232228 | 11/2021 | | |
| WO | 2022034484 A2 | 2/2022 | | |

OTHER PUBLICATIONS

International Search Report and Written Opinion—PCT/US2021/056552—ISA/EPO—dated Jan. 26, 2022.

* cited by examiner

SIDELINK POSITIONING REFERENCE SIGNAL CONFIGURATION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example first user equipment includes: an interface configured to send and receive signals wirelessly; a memory; and a processor communicatively coupled to the interface and the memory and configured to: establish a sidelink connection with a second user equipment; exchange, using the sidelink connection, sidelink information with the second user equipment to at least one of: transmit, via the interface to the second user equipment, first SL PRS-related data (sidelink positioning reference signal related data) including at least one of first SL PRS assistance data or first SL PRS configuration data; or receive, via the interface from the second user equipment, second SL PRS-related data including at least one of second SL PRS assistance data or second SL PRS configuration data; and exchange, via the interface with the second user equipment using the sidelink connection, one or more sidelink positioning reference signals in accordance with at least one of the first SL PRS-related data or the second SL PRS-related data.

Implementations of such a user equipment may include one or more of the following features. The processor is configured to exchange the sidelink information to receive the second SL PRS-related data, and the processor is configured to transmit, via the interface to the second user equipment, a request for the second SL PRS-related data. The request for the second SL PRS-related data includes an indication of a value of a sidelink positioning reference signal configuration parameter.

Also or alternatively, implementations of such a user equipment may include one or more of the following features. The processor is configured to exchange the sidelink information to receive the second SL PRS-related data, and the processor is configured to receive, via the interface from at least one of a base station or a server, third SL PRS-related data. The processor is configured to apply a priority rule to select between a first value of the second SL PRS-related data and a second value of the third SL PRS-related data in response to the first value and the second value being for a single sidelink positioning reference signal configuration parameter. The priority rule is based on an operational mode of the first user equipment.

Also or alternatively, implementations of such a user equipment may include one or more of the following features. The processor is configured to exchange the sidelink information to transmit the first SL PRS-related data, and the first SL PRS-related data includes an indication of a reference signal source for determining reference signal time difference by the second user equipment. The processor is configured to receive, via the interface from at least one of a base station or the second user equipment, one or more indications of a plurality of reference signal sources, and the processor is configured to select a particular reference signal source of the plurality of reference signal sources. The processor is configured to exchange the sidelink information to transmit the first SL PRS-related data, and the first SL PRS-related data includes at least one of: one or more quasi co-location parameter values; one or more indications of an expected reference signal time difference window; a positioning reference signal transmission pattern; or a positioning reference signal muting pattern.

Another example first user equipment includes: means for establishing a sidelink connection with a second user equipment; means for exchanging, using the sidelink connection, sidelink information with the second user equipment including at least one of: means for transmitting, to the second user equipment, first SL PRS-related data (sidelink positioning reference signal related data) including at least one of first SL PRS assistance data or first SL PRS configuration data; or means for receiving, from the second user equipment, second SL PRS-related data including at least one of second SL PRS assistance data or second SL PRS configuration data; and means for exchanging, with the second user equipment using the sidelink connection, one or more sidelink positioning reference signals in accordance with at least one of the first SL PRS-related data or the second SL PRS-related data.

Implementations of such a user equipment may include one or more of the following features. The means for exchanging the sidelink information include the means for receiving the second SL PRS-related data, the first user equipment including means for transmitting, to the second user equipment, a request for the second SL PRS-related data. The request for the second SL PRS-related data includes an indication of a value of a sidelink positioning reference signal configuration parameter.

Also or alternatively, implementations of such a user equipment may include one or more of the following features. The means for exchanging the sidelink information include the means for receiving the second SL PRS-related data, the first user equipment including means for receiving, from at least one of a base station or a server, third SL PRS-related data. The first user equipment includes means for applying a priority rule to select between a first value of the second SL PRS-related data and a second value of the third SL PRS-related data in response to the first value and the second value being for a single sidelink positioning reference signal configuration parameter. The priority rule is based on an operational mode of the first user equipment.

Also or alternatively, implementations of such a user equipment may include one or more of the following features. The means for exchanging the sidelink information include the means for transmitting the first SL PRS-related data, and the first SL PRS-related data includes an indication of a reference signal source for determining reference signal time difference by the second user equipment. The first user equipment includes: means for receiving, from at least one of a base station or the second user equipment, one or more indications of a plurality of reference signal sources, and means for selecting a particular reference signal source of the plurality of reference signal sources. The means for exchanging the sidelink information include the means for transmitting the first SL PRS-related data, and the first SL PRS-related data includes at least one of: one or more quasi co-location parameter values, one or more indications of an expected reference signal time difference window, a positioning reference signal transmission pattern; or a positioning reference signal muting pattern.

An example method for obtaining one or more positioning reference signals includes: establishing, by a first user equipment, a sidelink connection with a second user equipment; exchanging, using the sidelink connection, sidelink information between the first user equipment and the second user equipment, the exchanging the sidelink information including at least one of: transmitting, from the first user equipment to the second user equipment, first SL PRS-related data (sidelink positioning reference signal related data) including at least one of first SL PRS assistance data or first SL PRS configuration data; or receiving, by the first user equipment from the second user equipment, second SL PRS-related data including at least one of second SL PRS assistance data or second SL PRS configuration data; and exchanging, between the first user equipment and the second user equipment using the sidelink connection, one or more sidelink positioning reference signals in accordance with at least one of the first SL PRS-related data or the second SL PRS-related data.

Implementations of such a method may include one or more of the following features. Exchanging the sidelink information includes receiving the second SL PRS-related data, and the method includes transmitting, from the first user equipment to the second user equipment, a request for the second SL PRS-related data. The request for the second SL PRS-related data includes an indication of a value of a sidelink positioning reference signal configuration parameter.

Also or alternatively, implementations of such a method may include one or more of the following features. Exchanging the sidelink information includes receiving the second SL PRS-related data, and the method includes receiving, by the first user equipment from at least one of a base station or a server, third SL PRS-related data. The method includes applying a priority rule to select between a first value of the second SL PRS-related data and a second value of the third SL PRS-related data in response to the first value and the second value being for a single sidelink positioning reference signal configuration parameter. The priority rule is based on an operational mode of the first user equipment.

Also or alternatively, implementations of such a method may include one or more of the following features. Exchanging the sidelink information includes transmitting the first SL PRS-related data, and the first SL PRS-related data includes an indication of a reference signal source for determining reference signal time difference by the second user equipment. The indication of the reference signal source indicates a third user equipment as the reference signal source. The method includes: receiving, by the first user equipment from at least one of a base station or the second user equipment, one or more indications of a plurality of reference signal sources, and selecting, by the first user equipment, a particular reference signal source of the plurality of reference signal sources. Exchanging the sidelink information includes transmitting the first SL PRS-related data, and the first SL PRS-related data includes at least one of: one or more quasi co-location parameter values; one or more indications of an expected reference signal time difference window; a positioning reference signal transmission pattern; or a positioning reference signal muting pattern.

An example non-transitory, processor-readable storage medium includes processor-readable instructions configured to cause a processor of a first user equipment, to obtain one or more positioning reference signals, to: establish a sidelink connection with a second user equipment, exchange, using the sidelink connection, sidelink information with the second user equipment to at least one of: transmit, to the second user equipment, first SL PRS-related data (sidelink positioning reference signal related data) including at least one of first SL PRS assistance data or first SL PRS configuration data; or receive, from the second user equipment, second SL PRS-related data including at least one of second SL PRS assistance data or second SL PRS configuration data; and exchange, with the second user equipment using the sidelink connection, one or more sidelink positioning reference signals in accordance with at least one of the first SL PRS-related data or the second SL PRS-related data.

Implementations of such a storage medium may include one or more of the following features. The processor-readable instructions configured to cause the processor to exchange the sidelink information include processor-readable instructions configured to cause the processor to receive the second SL PRS-related data, and the storage medium includes processor-readable instructions configured to cause the processor to transmit, to the second user equipment, a request for the second SL PRS-related data. The request for the second SL PRS-related data includes an indication of a value of a sidelink positioning reference signal configuration parameter.

Also or alternatively, implementations of such a storage medium may include one or more of the following features. The processor-readable instructions configured to cause the processor to exchange the sidelink information include processor-readable instructions configured to cause the processor to receive the second SL PRS-related data, and the storage medium includes processor-readable instructions configured to cause the processor to receive, from at least one of a base station or a server, third SL PRS-related data. The storage medium includes processor-readable instructions configured to cause the processor to apply a priority rule to select between a first value of the second SL PRS-related data and a second value of the third SL PRS-related data in response to the first value and the second value being for a single sidelink positioning reference signal configuration parameter. The priority rule is based on an operational mode of the first user equipment.

Also or alternatively, implementations of such a storage medium may include one or more of the following features. The processor-readable instructions configured to cause the processor to exchange the sidelink information include processor-readable instructions configured to cause the processor to transmit the first SL PRS-related data, and the first SL PRS-related data includes an indication of a reference signal source for determining reference signal time difference by the second user equipment. The storage medium includes processor-readable instructions configured to cause the processor to: receive, from at least one of a base station or the second user equipment, one or more indications of a plurality of reference signal sources, and select a particular reference signal source of the plurality of reference signal sources. The processor-readable instructions configured to cause the processor to exchange the sidelink information include processor-readable instructions configured to cause the processor to transmit the first SL PRS-related data, and the first SL PRS-related data includes at least one of: one or more quasi co-location parameter values, one or more indications of an expected reference signal time difference window; a positioning reference signal transmission pattern; or a positioning reference signal muting pattern.

DETAILED DESCRIPTION

Figure 1:
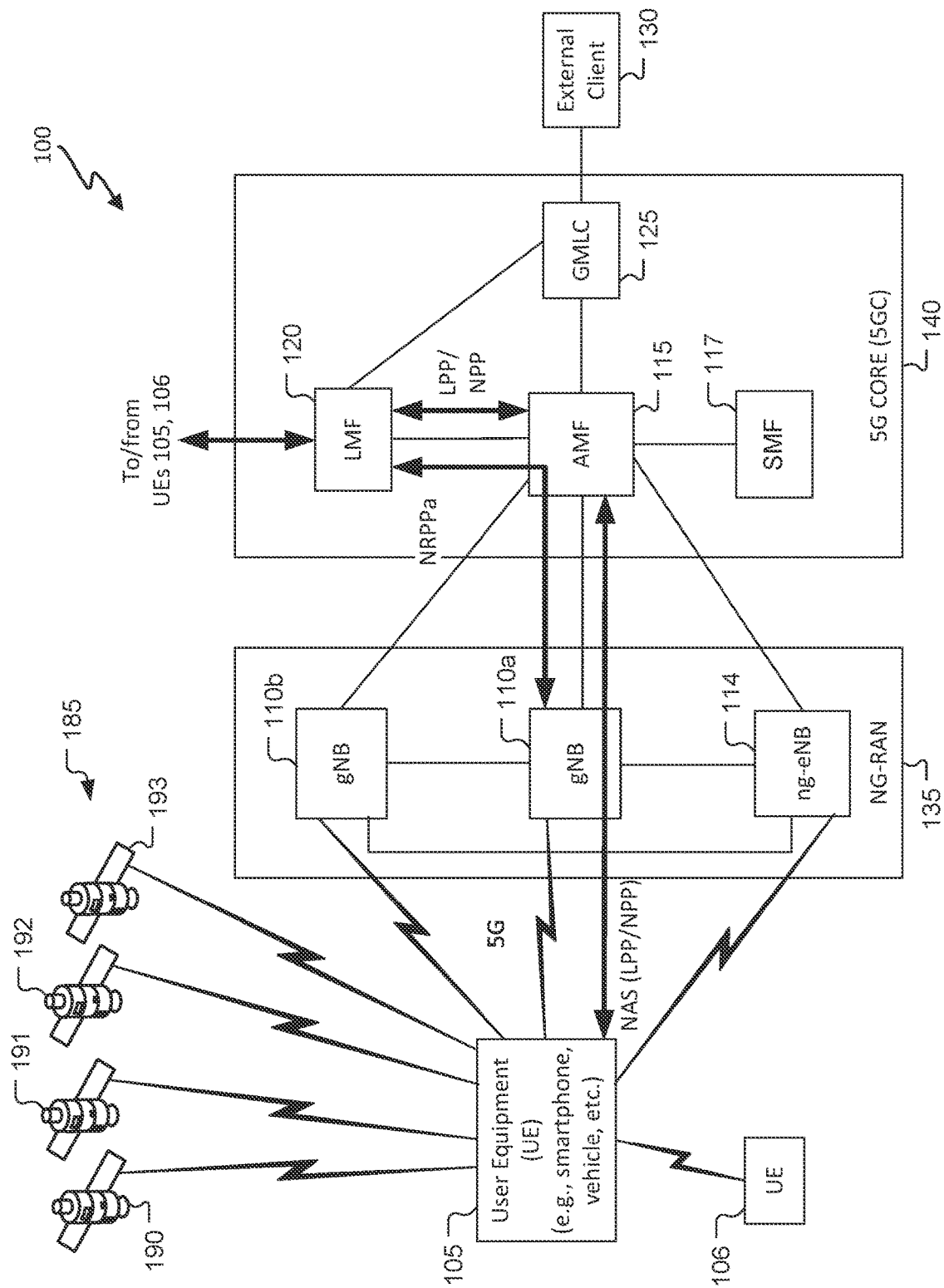
FIG. 1 is a simplified diagram of an example wireless communications system.

Techniques are discussed herein for exchanging sidelink positioning reference signal (SL PRS) configuration information between a target user equipment (UE) and an anchor UE. The target UE may provide some or all of the SL PRS configuration information or may request/trigger some or all of the SL PRS configuration information to be provided from the anchor UE or from the anchor UE and one or more other entities (e.g., a server, a base station, etc.). A request for SL PRS configuration information may request the configuration information generically or may request one or more specific SL PRS configuration parameters. If multiple entities supply multiple values for the same SL PRS configuration information (e.g., one or more parameters) to the target UE, then the target UE may apply one or more priority rules to determine which SL PRS configuration information to use. One or more priority rules may depend on a present SL operational mode of the target UE. Other example techniques may be implemented.

Items and/or techniques described herein may provide one or more of the following capabilities, as well as other capabilities not mentioned. Positioning of a target UE may be achieved in the absence of sufficient base stations for positioning of the target UE. Positioning accuracy of a target UE may be improved. Improved sidelink positioning reference signal configuration may be achieved. Sidelink positioning reference signal configuration may be obtained in less time than using configuration information from a base station and/or a server. Communication from a target UE may be improved, e.g., by using an anchor UE as a communication relay. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases. D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round-Trip Time (RTT), Multi-Cell RTT, Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a. 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT. RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs. WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
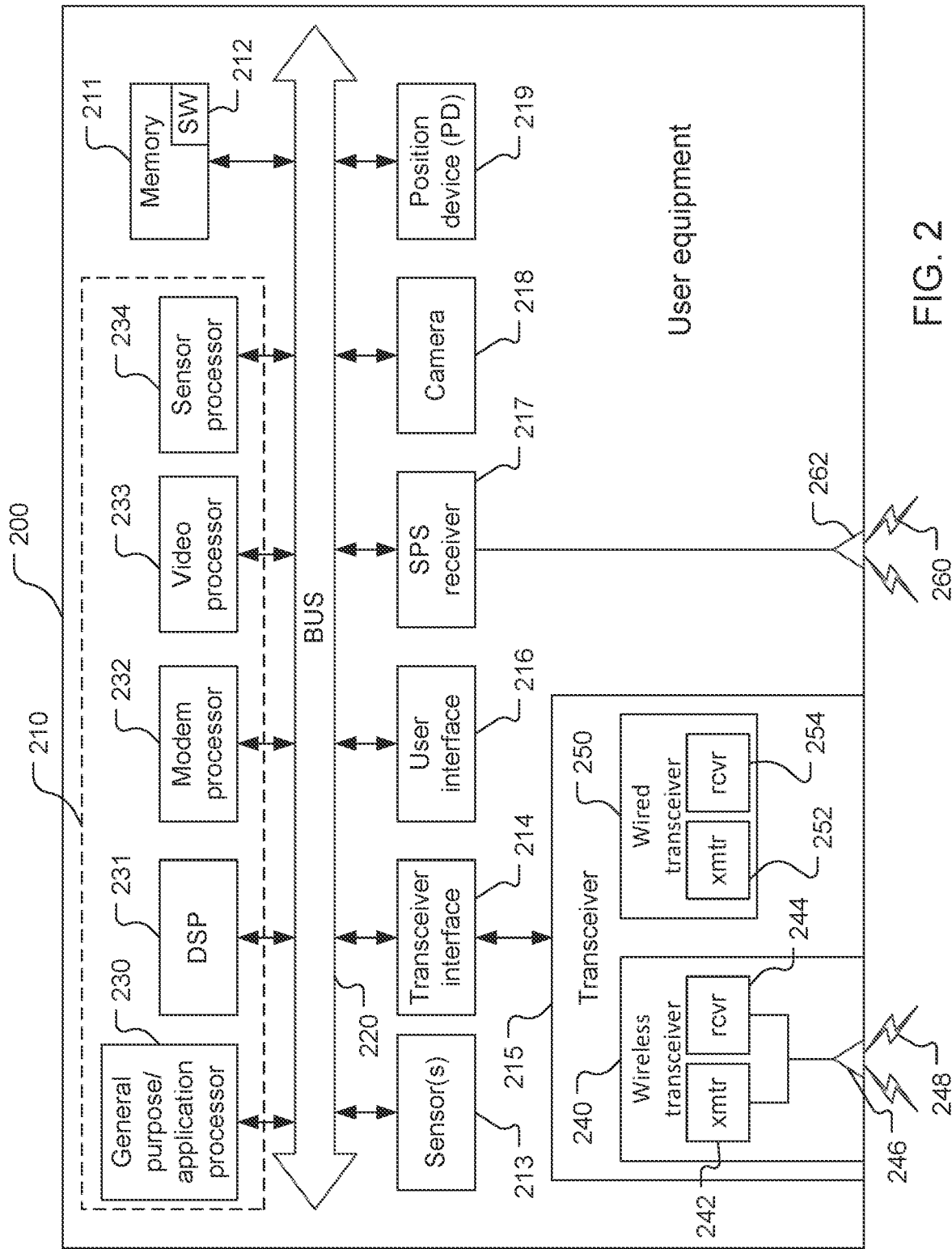
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions.

The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR). GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
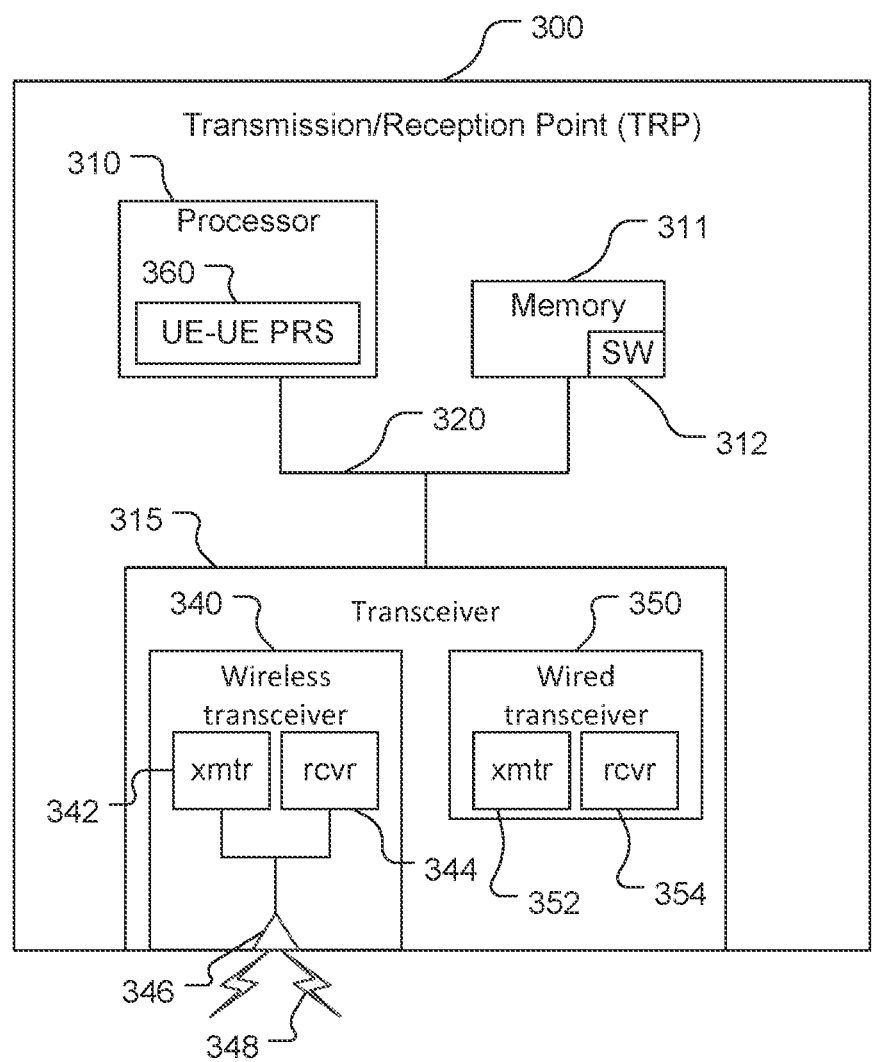
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., with the network 135 to send communications to, and receive communications from, the LMF 120, for example. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The description herein may refer only to the processor 310 performing a function, but this includes other implementations such as where the processor 310 executes software (stored in the memory 311) and/or firmware. The description herein may refer to the TRP 300 performing a function as shorthand for one or more appropriate components (e.g., the processor 310 and the memory 311) of the TRP 300 performing the function. The processor 310 (possibly in conjunction with the memory 311 and, as appropriate, the transceiver 315) includes UE-UE PRS unit 360. The UE-UE PRS unit 360 may be configured to coordinate with one or more UEs (e.g., the UE 200) for providing sidelink positioning reference signal (SL PRS) related data (e.g., SL PRS assistance data and/or SL PRS configuration data) to the UE(s). The configuration and functionality of the UE-UE PRS unit 360 is discussed further herein.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
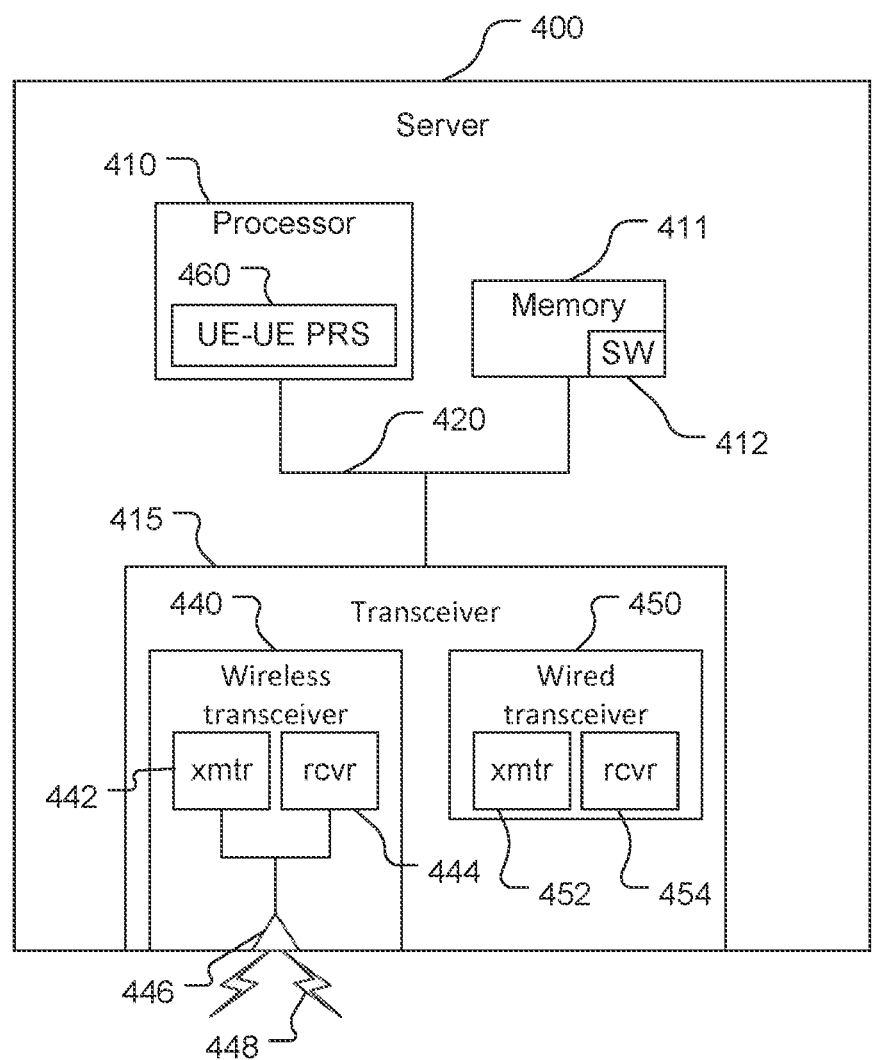
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices. e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., with the network 135 to send communications to, and receive communications from, the TRP 300, for example. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function. The processor 410 (possibly in conjunction with the memory 411 and, as appropriate, the transceiver 415) includes a UE-UE PRS unit 460. The UE-UE PRS unit 460 may be configured to coordinate with one or more UEs (e.g., the UE 200) for providing SL PRS-related data to the UE(s). The configuration and functionality of the UE-UE PRS unit 460 is discussed further herein.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$, or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx\text{-}Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-IRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

UE-to-UE Positioning

Figure 5:
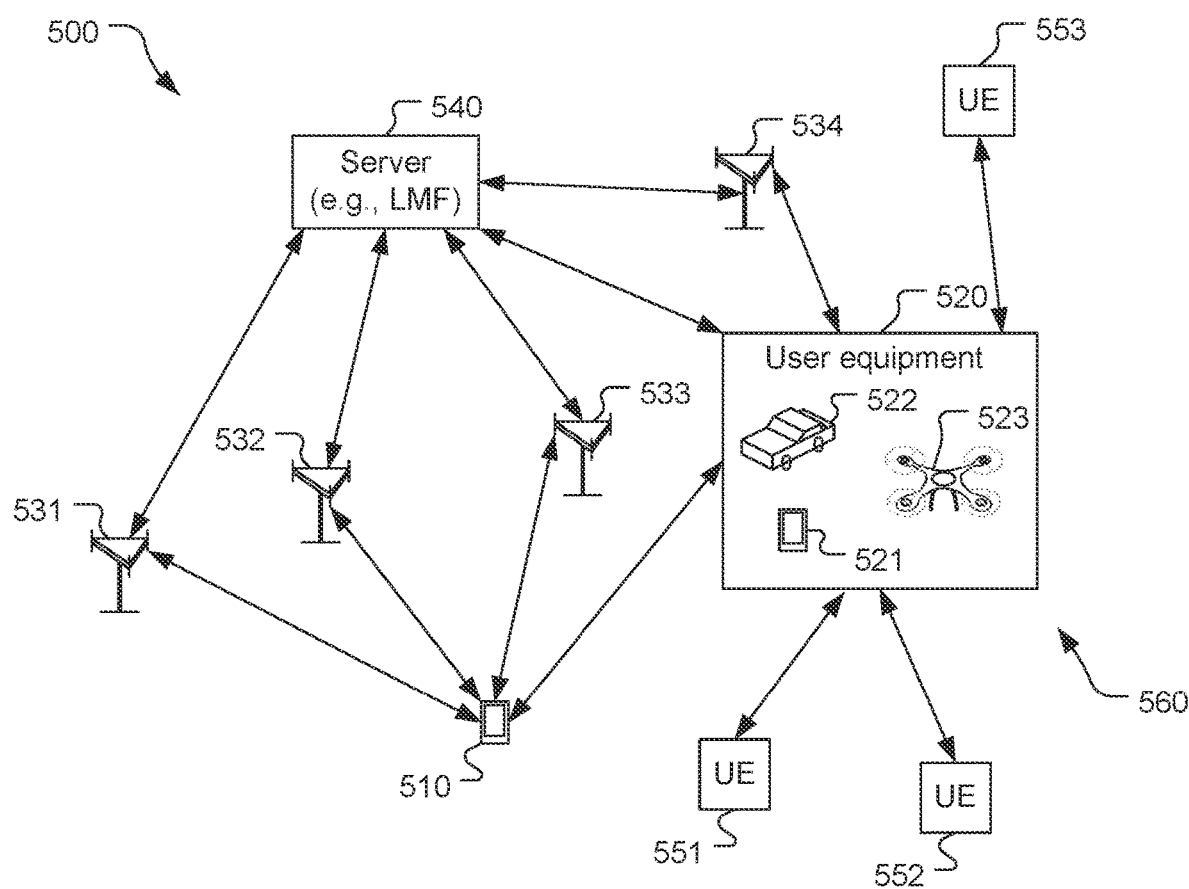
FIG. 5 is a simplified diagram of a positioning system.

Referring to FIG. 5, with further reference to FIGS. 1-4, a positioning system 500 includes a target UE 510, an anchor UE 520, TRPs 531, 532, 533, 534 (e.g., gNBs), a server 540, and other UEs 551, 552, 553. Each of the TRPs 531-534 may be an example of the TRP 300 and the server 540 may be an example of the server 400 (e.g., an LMF). Each of the UEs 510, 520, 551-553 may be an example of the UE 200, and may take any of a variety of forms. For example, the target UE 510 is shown as a smartphone, but other forms of UEs may be used such as those shown for the anchor UE 520 or others. The anchor UE 520 is shown as possibly being a smartphone 521, or a vehicle 522, or an unoccupied aerial vehicle (UAV) 523 (e.g., a drone), although other forms of UEs may be used. The anchor UE 520 may, for example, have more processing power and/or faster processing speed than a smartphone typically has. The anchor UE 520 may be the center of a star topology 560 including the target UE 510, the anchor UE 520, and the other UEs 551-553. The anchor UE 520 may serve as a controller of the star topology 560, e.g., to coordinate SL PRS configuration between the UEs 510, 520, 551-553. The target UE 510 may be configured to send and/or receive references signals to and/or from the TRPs 531-533 to help determine a position of the target UE 510, e.g., by measuring reference signals from one or more of the TRPs 531-533 and/or providing reference signals (e.g., SRS for positioning, also called UL-PRS) to the TRPs 531-533 for measurement. The TRPs 531-533 within communication range of the UE 510 may provide insufficient anchor points for determining a location of the UE 510, or determining the location of the target UE 510 with desired accuracy. Consequently, it may be desirable to be able to use one or more other UEs, e.g., the anchor UE 520, as an anchor point with which to exchange one or more reference signals for determining the position of the target UE 510, or for helping to determine the position of the target UE 510 (e.g., add to other measurements for determining the position of the target UE 510).

Figure 6:
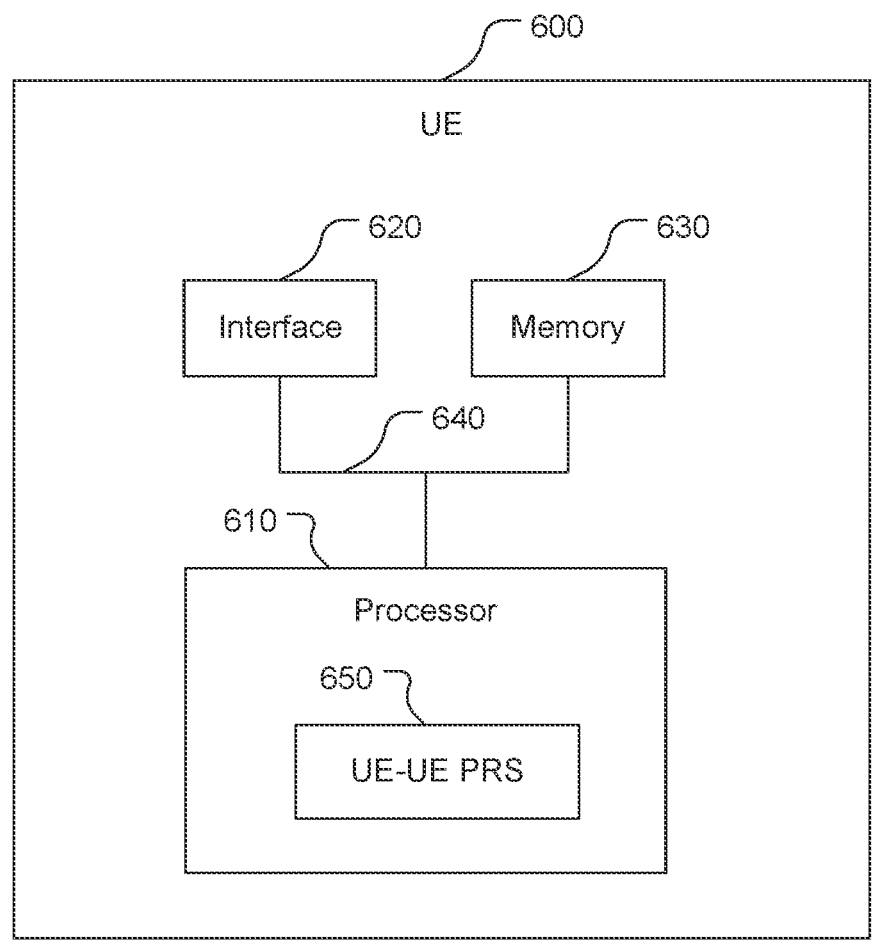
FIG. 6 is a block diagram of an example user equipment.

Referring to FIG. 6, with further reference to FIGS. 1-5, a UE 600 includes a processor 610, an interface 620, and a memory 630 communicatively coupled to each other by a bus 640. The UE 600 may include some or all of the components shown in FIG. 6, and may include one or more other components such as any of those shown in FIG. 2 such that the UE 200 may be an example of the UE 600. Also or alternatively, the UEs 510, 520 may be examples of the UE 600. The processor 610 may include one or more components of the processor 210. The interface 620 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 620 may include the wired transmitter 252 and/or the wired receiver 254. The interface 620 may include the SPS receiver 217 and the antenna 262. The memory 630 may be configured similarly to the memory 211, e.g., including software with processor-readable instructions configured to cause the processor 610 to perform functions.

The description herein may refer only to the processor 610 performing a function, but this includes other implementations such as where the processor 610 executes software (stored in the memory 630) and/or firmware. The description herein may refer to the UE 600 performing a function as shorthand for one or more appropriate components (e.g., the processor 610 and the memory 630) of the UE 600 performing the function. The processor 610 (possibly in conjunction with the memory 630 and, as appropriate, the interface 620) includes a UE-UE PRS unit 650. The UE-UE PRS unit 650 may be configured to provide SL PRS-related data to another UE, to request SL PRS-related data, to receive SL PRS-related data, and/or to use SL PRS-related data to obtain and measure SL PRS from another UE, e.g., the anchor UE 520, for use in determining a position of a target UE, e.g., the UE 510 which may be an example of the UE 600.

Referring again to FIG. 5, with further reference to FIGS. 1-4 and 6, the UEs 510, 520 (and possibly one or more other UEs) are configured to exchange SL PRS-related data and SL PRS. The SL PRS-related data may be used by one or more of the UEs 510, 520 to send and/or receive and help with measuring SL PRS. Assistance data may include data such as quasi co-location (QCL) information (e.g., antenna port, beam, etc.), a reference signal source (e.g., a reference signal source ID), an expected RSTD window (e.g., an expected RSTD and an RSTD uncertainty, or an expected RSTD window beginning and an expected RSTD window end), configuration information (e.g., transmission pattern (e.g., including offset(s) (e.g., time, frequency, symbol, etc.), comb number, repetition factor, etc.), muting pattern, etc.). Assistance data may be sent by the target UE 510 to the anchor UE 520 and/or from the anchor UE 520 to the target UE 510. Assistance data may also be obtained from one or more other entities, e.g., one or more of the TRPs 531-533 (e.g., a serving TRP) and/or the server 540. Sidelink PRS may be sent from the target UE 510 to the anchor UE 520 and/or from the anchor UE 520 to the target UE 510.

The UEs 510, 520 may operate in different SL operational modes. For example, in a mode commonly referred to as mode 1, PRS resources are scheduled, or at least some PRS configuration parameters provided by, a serving TRP, e.g., the TRP 531 for the target UE 510 and the 534 the anchor UE 520. In a mode commonly referred to as mode 2, the serving TRP assigns a resource pool and the UEs 510, 520 determine how to use the resource pool, e.g., for SL PRS exchange.

The UEs 510, 520 may request SL PRS-related data (e.g., SL PRS assistance data and/or SL PRS configuration data). For example, the target UE 510 (e.g., the UE-UE PRS unit 650) may be configured to send a generic request to the anchor UE 520 and/or to one or more other entities such as one or more of the TRPs 531-533 and/or the server 540 for SL PRS-related data. Also or alternatively, the target UE 510 may be configured to request one or more specific items of SL PRS-related data, e.g., requesting one or more specific QCL values, one or more SL PRS configuration parameter values, etc. The target UE 510 may request SL PRS-related data to change a present SL PRS configuration and/or present SL PRS assistance data, for example, to help improve reception and/or measurement of SL PRS, e.g., if the target UE 510 is unable to measure, at least with a desired level of accuracy and/or confidence. SL PRS using the present SL PRS configuration.

The UEs 510, 520 (e.g., the UE-UE PRS unit 650) may obtain SL PRS-related data, e.g., SL PRS configuration information, from multiple sources. For example, while the target UE 510 may obtain QCL information from the anchor UE 520 alone (e.g., in particular if the target UE 510 and the anchor UE 520 have an established SL communication link), the target UE 510 may obtain QCL information from a serving base station, e.g., the TRP 531, or from the anchor UE 520 and the TRP 531. As another example, a transmission pattern and/or a muting pattern may be obtained by the target UE 510 from the serving TRP 531.

The UEs 510, 520 (e.g., the UE-UE PRS unit 650) may be configured to apply one or more priority rules to multiple values of a single SL PRS-related data parameter in order to select one of the values for the SL PRS-related data parameter. For example, the target UE 510 may be configured to give priority to QCL information provided by the anchor UE 520 (especially if the target UE 510 and the anchor UE 520 have an established SL communication link), over QCL information provided by a TRP, e.g., the serving TRP 531 for the target UE 510. As another example, the target UE 510 may give priority to a parameter (or parameters) stored by the target UE 510, e.g., over a parameter (or parameters) received by the target UE 510 (e.g., from another UE). As other examples, a transmission pattern (e.g., time offset, comb number, etc.), a muting pattern, and/or a transmit power provided by the TRP 531 may be given higher priority (and thus selected) over such information provided by the target UE 510 or the anchor UE 520. The priority rule applied may depend on the operational mode of the UE, e.g., with SL PRS-related data provided by a TRP being given higher priority in mode 1 and lower priority in mode 2.

Figure 7:
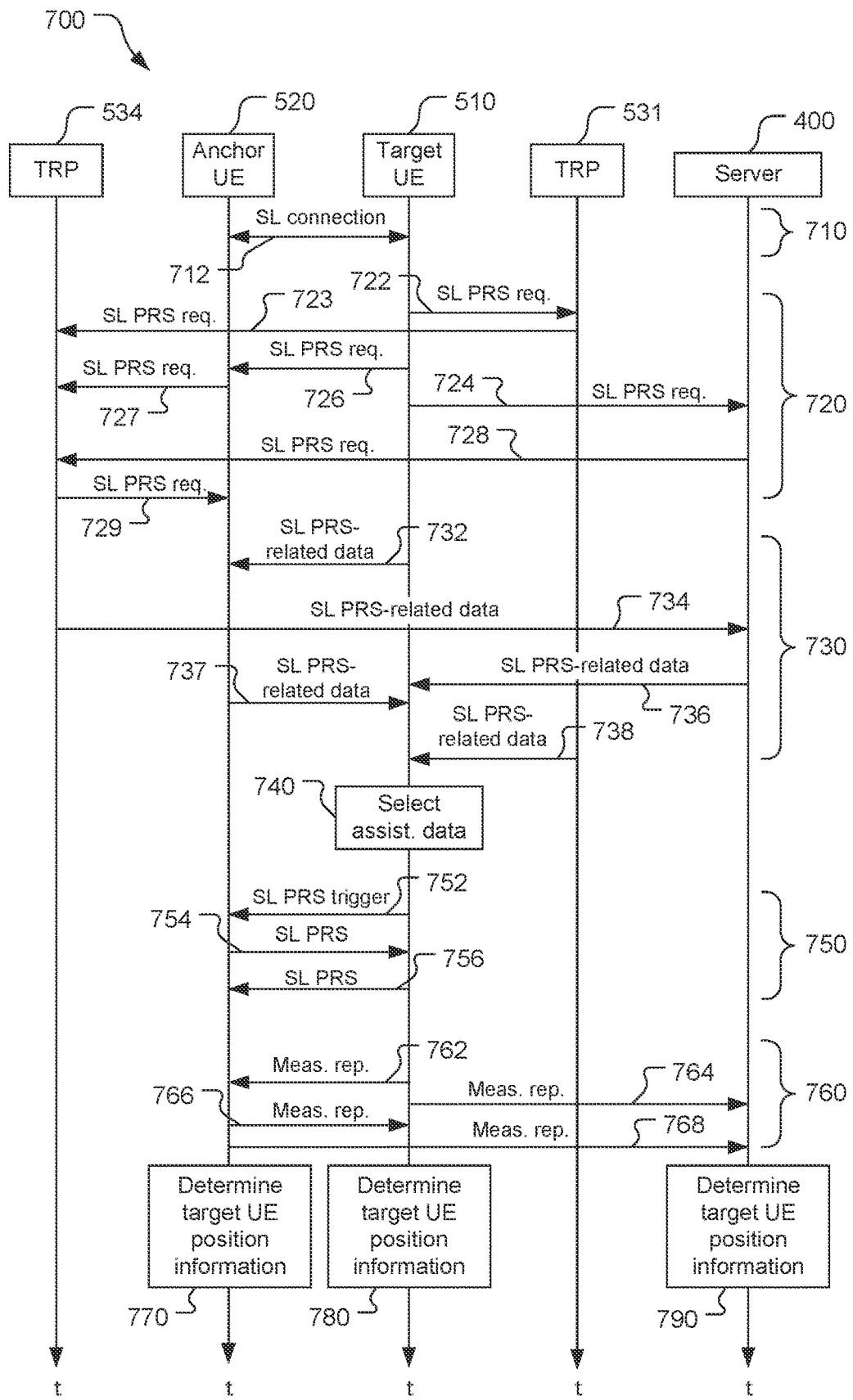
FIG. 7 is a processing and signal flow for determining position information.

Referring also to FIG. 7, a processing and signal flow 700 for determining position information includes the stages shown. The flow 700 is an example, and stages may be added to, removed from, and/or rearranged in the flow 700.

At stage 710, a sidelink connection 712 may be established between the target UE 510 and the anchor UE 520. The target UE 510 and the anchor UE 520 may perform a handshake procedure to establish the SL connection 712. The SL connection 712 may be established at a different time in the flow 700 than shown, e.g., after stage 720 or after stage 730 (with SL PRS-related data being requested and obtained without using a sidelink connection, e.g., via uplink and/or downlink connections).

At stage 720, provision of SL PRS-related data may be initiated. For example, one or more requests for SL PRS-related data may be sent by the target UE 510 to trigger provision of SL PRS-related data. As another example, another entity such as the anchor UE 520 or the server 400 may start the procedure by sending the SL PRS-related data to the target UE 510, e.g., as discussed below with respect to stage 730, without having received a request and thus in response to receipt of a request from the target UE 510. As shown, one or more requests for SL PRS-related data may be sent by the target UE 510, e.g., by the UE-UE PRS unit 650 via the interface 620. For example, the target UE 510 may send an SL PRS-related data request 722 to the TRP 531, that is a serving TRP for the target UE 510. The TRP 531 may send an SL PRS request to the TRP 534, which may respond to receiving the request 723 by sending a request 729. Also or alternatively, the target UE 510 may send an SL PRS-related data request 724 to the server 400 (either directly, as shown, or via the TRP 531). Also or alternatively, the target UE 510 may send an SL PRS-related data request 726 to the anchor UE 520, and the anchor UE 520 may send an SL PRS-related data request 727 to the TRP 534, which is the serving TRP for the anchor UE 520. While the request 726 is shown being sent directly to the anchor UE 520 from the target UE 510, e.g., via the SL connection 712, the SL PRS-related data request may be indirect, e.g., including the request 724, a request 728 from the server 400 to the TRP 534 serving the anchor UE 520, and the request 729 from the TRP 534 to the anchor UE 520. The content of the request 729 may differ depending upon whether the request 729 is sent in response to receiving the request 723 or the request 728. Any of the SL PRS-related data requests 722, 724, 726 may include a trigger for positioning for the target UE 510 and thus an implicit request for SL PRS-related data, or and/or may include an explicit request for SL PRS-related data. An explicit request for SL PRS-related data may be generic, requesting SL PRS-related data for any other UE or for the anchor UE 520 explicitly without specifying any requested SL PRS-related data values. An explicit request for SL PRS-related data may include one or more requested SL PRS assistance data values (e.g., QCL values such as antenna port and/or beam(s)), or expected RSTD and uncertainty, and/or one or more SL PRS configuration data values (e.g., a quantity of further PRS instances to be transmitted, one or more transmission schedule values (e.g., frequency layer, comb number, time offset, frequency offset, etc.)). The requested SL PRS-related data may be requested to change a PRS configuration from a present PRS configuration that is not yielding adequate results (e.g., signal acquisition, measurement accuracy, etc.). An explicit request for SL PRS-related data may include a generic request for SL PRS-related data in addition to one or more specifically-requested SL PRS-related data values, e.g., if SL PRS-related data values are not requested for all SL PRS-related data to be used. The request(s) 722, 724, 726 may be triggers, may be ad hoc, because SL PRS may not be scheduled for periodic transmission, and may request SL PRS-related data for SL Rx-based positioning (where the target UE 510 will receive SL PRS transmitted by the anchor UE 520), for SL Tx-based positioning (where the target UE 510 will transmit SL PRS to the anchor UE 520), or a combination of SL Rx-based positioning and SL Tx-based positioning. The target UE 510 may not send an SL PRS-related data request. e.g., if the target UE 510 provides (e.g., determines and provides) the SL PRS configuration to the anchor UE 520 (and any other UE 600 as appropriate). Stage 720 may be omitted, e.g., if the target UE 510 solely determines the SL PRS-related data.

At stage 730, the target UE 510 may transmit and/or receive (e.g., in response to a request) SL PRS-related data for use in SL PRS exchange with (transmission to and/or reception from) the anchor UE 520. For example, the target UE 510 (e.g., the UE-UE PRS unit 650) may send an SL PRS-related data message 732 to the anchor UE 520 with SL PRS-related data. The SL PRS-related data may include SL PRS assistance data such as quasi co-location (QCL) information (e.g., antenna port, beam, etc.), a reference signal source (e.g., a reference signal source ID), an expected RSTD window (e.g., an expected RSTD and an RSTD uncertainty, or an expected RSTD window beginning and an expected RSTD window end), and/or SL PRS configuration data (e.g., transmission pattern (e.g., including offset(s) (e.g., time, frequency, symbol, etc.), comb number, repetition factor, etc.), muting pattern, etc.). The muting pattern indicates one or more portions (e.g., instance(s), slot(s), symbol(s), etc.) of SL PRS scheduled for transmission that is(are) not to be transmitted. The SL PRS-related data may include data determined by the target UE 510 (e.g., the UE-UE PRS unit 650) and/or obtained by the target UE 510, e.g., from one or more other entities such as the anchor UE 520, the TRP 531, the server 400, etc. For example, an SL PRS-related data message 737 from the anchor UE 520 to the target UE 510 and/or an SL PRS-related data message 738 from the TRP 531 and/or an SL PRS-related data message 736 from the server 400 (based on an SL PRS-related data message from the TRP 534) may indicate a recommended reference signal source for use by the target UE 510 in determining an RSTD value. The target UE 510 may be configured to select from multiple recommended reference signal sources. The assistance data may include one or more indications of an expected RSTD window (e.g., an expected RSTD and an uncertainty of the expected RSTD, or beginning and end times of the expected RSTD window). The TRP 534 may provide one or more SL PRS-related data values in an SL PRS-related data request 724 to the server 400. The server 400, the anchor UE 520, and/or the TRP 531 may provide one or more SL PRS-related data values via one or more SL PRS-related data messages 736, 737, 738, respectively. Different entities may provide values of different SL PRS-related data parameters, e.g., with a transmission pattern and/or muting pattern being provided by one or more TRPs 300 and QCL parameter values being provided by the target UE 510 and/or the anchor UE 520 (especially if the target UE 510 and the anchor UE 520 have an established SL connection). Different portions of SL PRS-related data may be obtained by the target UE 510 from multiple entities, e.g., the target UE 510, the anchor UE 520, the TRP 531, the TRP 534, and/or the server 400, and/or one or more other entities. While the messages 732, 737 are shown being sent directly between the anchor UE 520 and the target UE 510, e.g., via the SL connection 712, the content of the message(s) 732, 737 may be exchanged indirectly, e.g., via the TRPs 531, 534 and/or the server 400. The SL PRS-related data, e.g., SL PRS configuration data, may establish the anchor UE 520 as an SL Tx UE for SL Rx-based positioning or an SL Rx UE for SL Tx-based positioning, or a combination thereof for SL Rx-and-Tx-based positioning. The anchor UE 520 may also obtain the SL PRS-related data from one or more entities (e.g., the TRP 534, the TRP 531, the server 400, etc.) other than the anchor UE 520 and/or the target UE 510.

The anchor UE 520 may coordinate the SL PRS configuration. For example, the anchor UE 520 (e.g., the UE-UE PRS unit 650 of the anchor UE 520) may provide SL PRS-related data to the target UE 510 and one or more of the other UEs 551-553 to coordinate the SL PRS configuration in the star topology 560 of UEs.

At stage 740, the target UE 510 selects SL PRS-related data values from among multiple values obtained for the same parameter. For example, the UE-UE PRS unit 650 may be configured to apply one or more priority rules to select which of multiple values to use for a single SL PRS-related data parameter. The rule(s) applied may depend on one or more factors. e.g., a present operational mode of the UE 600 (e.g., mode 1 or mode 2). For example, in mode 1, PRS configuration parameters obtained from the TRP 531 may have higher priority and in mode 2, PRS configuration parameters from a UE, e.g., the anchor UE 520, may have higher priority. The priority rule(s) may, for example, cause the UE-UE PRS unit 650 to select QCL value(s) (e.g., antenna port, beam) obtained from the target UE 510 or the anchor UE 520 (e.g., determined by the target UE 510 or received from the anchor UE 520) instead of QCL value(s) obtained from another entity such as the TRP 531 or the server 400. As another example, the priority rule(s) may cause the UE-UE PRS unit 650 to select the transmission pattern, muting pattern, time offset, and/or transmit power obtained from the TRP 531 instead of values for such parameters obtained from one or more other entities. One or more priority rules may be statically configured, e.g., pre-programmed/hard-coded during manufacture of the target UE 510. One or more priority rules may be dynamically configured, e.g., according to a message (e.g., an RRC (Radio Resource Control)) message received from the TRP 531 or the server 400 (e.g., an LMF). The anchor UE 520 may be configured similarly to the target UE 510, e.g., such that the anchor UE 520 may provide and/or receive and use SL PRS (e.g., to measure the SL PRS and determine position information (e.g., PRS measurement(s), range(s), location estimate(s), etc.). For example, while not shown, the anchor UE 520 may receive some or all of the SL PRS-related data from the TRP 534, the server 400, and/or one or more other entities, and/or by determination by the anchor UE 520 (e.g., the UE-UE PRS unit 650 of the anchor UE 520) and may select SL PRS-related data values based on one or more priority rules as appropriate.

At stage 750, SL PRS is(are) exchanged between the target UE 510 and the anchor UE 520. The target UE 510 and/or the anchor UE 520 may transmit and/or receive other PRS (e.g., receive DL PRS from one or more TRPs, and/or transmit UL PRS to one or more TRPs, and/or transmit/receive SL PRS between one or more other UEs) in addition to the SL PRS exchange between the UEs 510, 520. The target UE 510 may send a trigger message 752 to trigger the transmission of SL PRS 754 by the anchor UE 520 (and/or vice versa), e.g., as the SL PRS may not be scheduled for periodic transmission. The anchor UE 520 may send SL PRS 754 to the target UE 510, and the target UE 510 may measure the received SL PRS 754, and/or the target UE 510 may send SL PRS 756 to the anchor UE 520, and the anchor UE 520 may measure the received SL PRS 756. The UEs 510, 520 may send the SL PRS 754, 756 per the SL PRS configuration of the SL PRS-related data. The target UE 510 sends the SL PRS 756 for Tx-based positioning and the anchor UE 520 sends the SL PRS 754 for Rx-based positioning, and the UEs 510, 520 send the SL PRS 754, 756 for Tx-and-Rx-based positioning.

At stage 760, the target UE 510 and/or the anchor UE 520 may transmit one or more measurement reports as appropriate. For example, the target UE 510 may transmit a measurement report 762 to the anchor UE 520 in response to the target UE 510 receiving and measuring the SL PRS 754, and if the anchor UE 520 is to determine position information from SL PRS measurement(s) by the target UE 510 (e.g., to implement or facilitate SL Rx-based positioning). As another example, the target UE 510 may transmit a measurement report 764 to the server 400 in response to the target UE 510 receiving and measuring the SL PRS 754, and if the server 400 is to determine position information from SL PRS measurement(s) by the target UE 510 (e.g., to facilitate SL-assisted positioning). As another example, the anchor UE 520 may transmit a measurement report 766 to the target UE 510 in response to the anchor UE 520 receiving and measuring the SL PRS 756, and if the target UE 510 is to determine position information from SL PRS measurement(s) by the anchor UE 520 (e.g., to facilitate SL Tx-based positioning). As another example, the anchor UE 520 may transmit a measurement report 768 to the server 400 in response to the anchor UE 520 receiving and measuring the SL PRS 756, and if the server 400 is to determine position information from SL PRS measurement(s) by the anchor UE 520 (e.g., to facilitate SL-assisted positioning). Any or all of the measurement reports 762, 764, 766, 768 may be omitted. e.g., if the target UE 510 determines position information (e.g., PRS measurement(s), range(s), location(s), etc.) for use by an application local to the target UE 510. As another example, the measurement reports 764, 768 may be omitted for purely SL-based positioning.

At stages 770, 780, 790, position information for the target UE 510 may be determined, e.g., using one or more positioning techniques (e.g., discussed above) based on one or more PRS measurements. The stages 770, 780, 790 may be performed at different times, and one or more of the stages 770, 780, 790 may be omitted from the flow 700. Stages 770, 780 are for SL-based positioning and stage 790 is for SL-assisted positioning. At stage 770, the anchor UE 520 may determine position information (e.g., one or more position estimates) for the target UE 510, e.g., based on measurement(s) of the SL PRS 756 and/or the measurement report 762. At stage 780, the target UE 510 may determine position information for the target UE 510, e.g., based on measurement(s) of the SL PRS 754 and/or the measurement report 766. At stage 790, the server 400 may determine position information for the target UE 510 based on the measurement report 764 and/or the measurement report 768.

Figure 8:
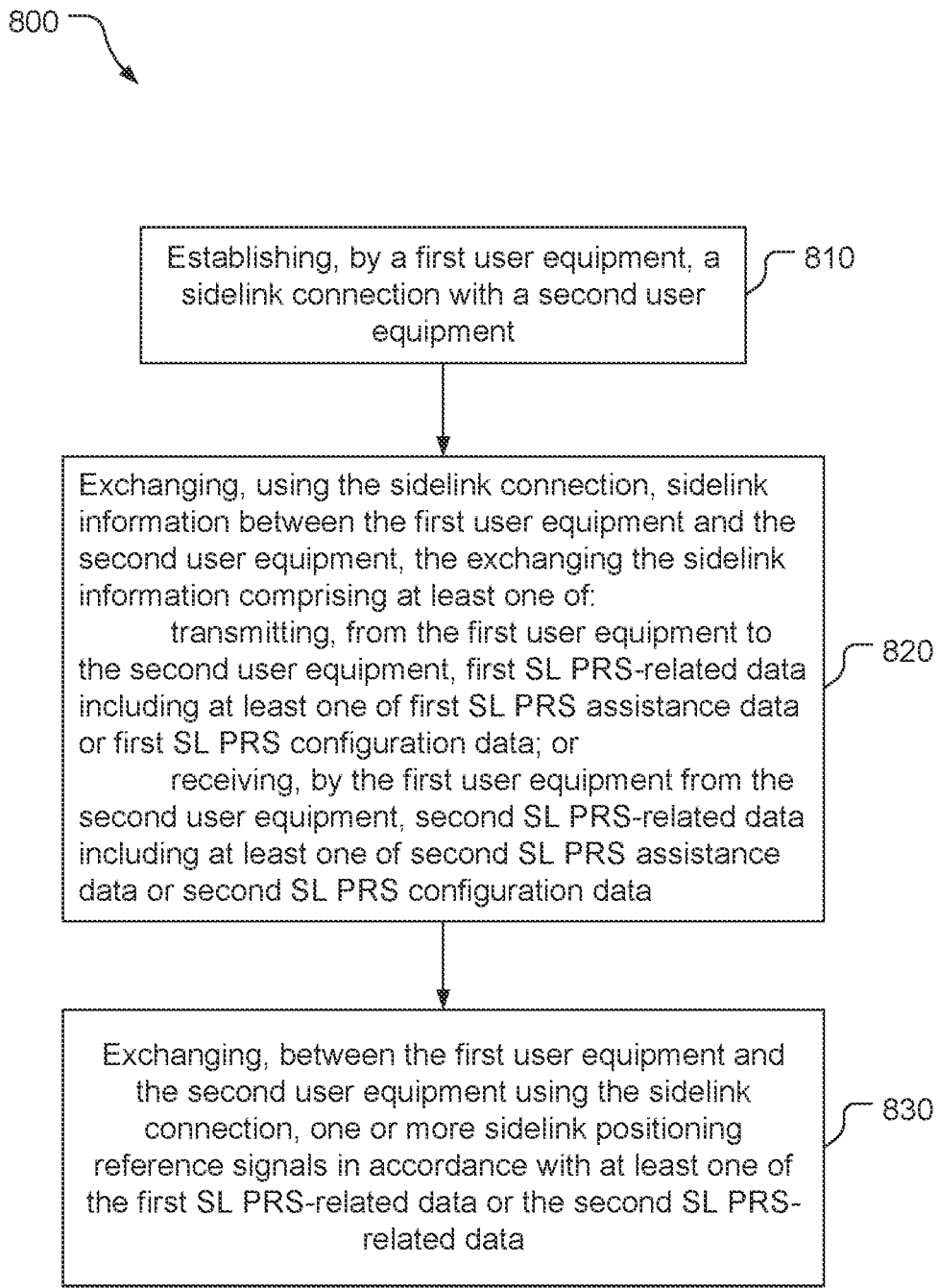
FIG. 8 is a block flow diagram of a method obtaining one or more positioning reference signals.

Referring to FIG. 8, with further reference to FIGS. 1-7, a method 800 for obtaining one or more positioning reference signals includes the stages shown. The method 800 is, however, an example only and not limiting. The method 800 may be altered, e.g., by having stages added, removed, rearranged, combined, performed concurrently, and/or having single stages split into multiple stages.

At stage 810, the method 800 includes establishing, by a first user equipment, a sidelink connection with a second user equipment. For example, the target UE 510 establishes the sidelink connection 712 with the anchor UE 520. The target UE 510 and/or the anchor UE 520 may establish SL connections with one or more other UEs as well. The processor 610, possibly in combination with the memory 630, in combination with the interface 620 (e.g., the wireless transmitter 242, the wireless receiver 244, and the antenna 246) may comprise means for establishing a sidelink connection.

At stage 820, the method 800 includes exchanging, using the sidelink connection, sidelink information between the first user equipment and the second user equipment, the exchanging the sidelink information comprising at least one of: transmitting, from the first user equipment to the second user equipment, first SL PRS-related data (sidelink positioning reference signal related data) including at least one of first SL PRS assistance data or first SL PRS configuration data; or receiving, by the first user equipment from the second user equipment, second SL PRS-related data including at least one of second SL PRS assistance data or second SL PRS configuration data. For example, the target UE 510 may send the SL PRS-related data message 732 (with the anchor UE 520 receiving the message 732) and/or the anchor UE 520 may send the SL PRS-related data message 737 (with the target UE receiving the message 737). SL PRS-related data may also be transmitted to and/or received from one or more other entities (e.g., one or more TRPs 300 and/or the server 400). The processor 610, possibly in combination with the memory 630, in combination with the interface 620 (e.g., the wireless transmitter 242 and the antenna 246, and/or the wireless receiver 244 and the antenna 246) may comprise means for exchanging one or more communications between the first UE and the second UE.

At stage 830, the method 800 includes exchanging, between the first user equipment and the second user equipment using the sidelink connection, one or more sidelink positioning reference signals in accordance with at least one of the first SL PRS-related data or the second SL PRS-related data. For example, the target UE 510 may send the SL PRS 756 to the anchor UE 520 and/or the anchor UE 520 may send the SL PRS 754 to the target UE 510. The processor 610, possibly in combination with the memory 630, in combination with the interface 620 (e.g., the wireless transmitter 242 and the antenna 246, and/or the wireless receiver 244 and the antenna 246) may comprise means for exchanging one or more sidelink positioning reference signals.

Implementations of the method 800 may include one or more of the following features. In an example implementation, exchanging the sidelink information comprises receiving the second SL PRS-related data, the method further comprising transmitting, from the first user equipment to the second user equipment, a request for the second SL PRS-related data. For example, the target UE 510 may send the SL PRS-related data request 722 directly to the anchor UE 520, and/or may send one or more of the SL PRS-related data requests 722, 724, which may result in the target UE 510 indirectly sending a request for SL PRS-related data to the anchor UE 520. The anchor UE 520 may also or alternatively send one or more requests for SL PRS-related data directly and/or indirectly to the target UE 510. The processor 610, possibly in combination with the memory 630, in combination with the interface 620 (e.g., the wireless transmitter 242 and the antenna 246) may comprise means for transmitting the request for the second SL PRS-related data. In another example implementation, the request for the second SL PRS-related data includes an indication of a value of a sidelink positioning reference signal configuration parameter. For example, the request may include an indication of a quantity of PRS instances and/or one or more transmission pattern parameters (e.g., time offset, frequency offset, symbol offset, comb number, frequency layer, etc.).

Also or alternatively, implementations of the method 800 may include one or more of the following features. In an example implementation, exchanging the sidelink information comprises receiving the second SL PRS-related data, the method further comprising receiving, by the first user equipment from at least one of a base station or a server, third SL PRS-related data. For example, the target UE 510 may receive the SL PRS-related data message 736 from the server 400 and/or the SL PRS-related data message 738 from the TRP 531. The third SL PRS-related data may include third SL PRS assistance data and/or third SL PRS configuration data. The processor 610, possibly in combination with the memory 630, in combination with the interface 620 (e.g., the wireless receiver 244 and the antenna 246) may comprise means for receiving the third SL PRS-related data. In another example implementation, the method may comprise applying a priority rule to select between a first value of the second SL PRS-related data and a second value of the third SL PRS-related data in response to the first value and the second value being for a single sidelink positioning reference signal configuration parameter. For example, the target UE 510 may use one or more priority rules (e.g., statically configured by being preprogrammed and stored in the memory 630 during manufacture and/or dynamically configured by one or more received communications) to select from among multiple values of the same parameter (e.g., configuration parameter or assistance data parameter), e.g., as discussed with respect to stage 740. The processor 610, possibly in combination with the memory 630, may comprise means for applying the priority rule to select between the first value of the second SL PRS-related data and the second value of the third SL PRS-related data. In another example implementation, the priority rule is based on an operational mode of the first user equipment. For example, the priority rule applied by the target UE 510 may be different depending on whether the target UE 510 is operating in mode 1 or mode 2.

Also or alternatively, implementations of the method 800 may include one or more of the following features. In an example implementation, exchanging the sidelink information comprises transmitting the first SL PRS-related data, and the first SL PRS-related data includes an indication of a reference signal source for determining reference signal time difference by the second user equipment. For example, for Tx-based positioning, the target UE 510 may indicate to the anchor UE 520 which entity (e.g., base station or other UE) to use for determining an RSTD measurement. In another example implementation, the indication of the reference signal source indicates a third UE as the reference signal source.

Also or alternatively, implementations of the method 800 may include one or more of the following features. In an example implementation, the method comprises: receiving, by the first user equipment from at least one of a base station or the second user equipment, one or more indications of a plurality of reference signal sources, and selecting, by the first user equipment, a particular reference signal source of the plurality of reference signal sources. For example, the target UE 510 may receive, e.g., from one or more of the anchor UE 520, the TRP 531, the server 400, another TRP 300, and/or another server 400, one or more indications of multiple possible reference signal sources, and may select one (or more) of the possible reference signal sources, e.g., to use for one or more RSTD measurements. The processor 610, possibly in combination with the memory 630, in combination with the interface 620 (e.g., the wireless receiver 244 and the antenna 246) may comprise means for receiving the one or more indications of a plurality of reference signal sources, and the processor 610, possibly in combination with the memory 630, may comprise means for selecting a particular reference signal source of the plurality of reference signal sources. In another example implementation, exchanging the sidelink information comprises transmitting the first SL PRS-related data, and the first SL PRS-related data includes at least one of: one or more quasi co-location parameter values; one or more indications of an expected reference signal time difference window; a positioning reference signal transmission pattern; or a positioning reference signal muting pattern.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B. or C" means A. or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value. e.g., the second threshold value being one value lower than the first threshold value in the resolution of a computing system.

The invention claimed is:

1. A first user equipment comprising:
an interface configured to send and receive signals wirelessly;
a memory; and
a processor communicatively coupled to the interface and the memory and configured to:
establish a sidelink connection with a second user equipment;
transfer, using the sidelink connection, sidelink information with the second user equipment to
receive, via the interface from the second user equipment, second SL PRS-related data (sidelink positioning reference signal related data) including at least one of second SL PRS assistance data or second SL PRS configuration data;
transfer, via the interface with the second user equipment using the sidelink connection, one or more sidelink positioning reference signals in accordance with the second SL PRS-related data; and
transmit, via the interface to the second user equipment, a request for the second SL PRS-related data, wherein the request for the second SL PRS-related data includes an indication of a value of a sidelink positioning reference signal configuration parameter.

2. The first user equipment of claim 1, wherein the processor is configured to receive, via the interface from at least one of a base station or a server, third SL PRS-related data.

3. The first user equipment of claim 2, wherein the processor is configured to apply a priority rule to select between a first value of the second SL PRS-related data and a second value of the third SL PRS-related data in response to the first value and the second value being for a single sidelink positioning reference signal configuration parameter.

4. The first user equipment of claim 3, wherein the priority rule is based on an operational mode of the first user equipment.

5. The first user equipment of claim 1, wherein the processor is configured to transfer the sidelink information to transmit, via the interface to the second user equipment, first SL PRS-related data including at least one of first SL PRS assistance data or first SL PRS configuration data.

6. The first user equipment of claim 5, wherein the first SL PRS-related data includes an indication of a reference signal source for determining reference signal time difference by the second user equipment.

7. The first user equipment of claim 5, wherein the first SL PRS-related data includes at least one of: one or more quasi co-location parameter values; one or more indications of an expected reference signal time difference window; a positioning reference signal transmission pattern; or a positioning reference signal muting pattern.

8. The first user equipment of claim 1, wherein the processor is configured to receive, via the interface from at least one of a base station or the second user equipment, one or more indications of a plurality of reference signal sources, and wherein the processor is configured to select a particular reference signal source of the plurality of reference signal sources.

9. A first user equipment comprising:
means for establishing a sidelink connection with a second user equipment;
means for transferring, using the sidelink connection, sidelink information with the second user equipment comprising
means for receiving, from the second user equipment, second SL PRS-related data (sidelink positioning reference signal related data) including at least one of second SL PRS assistance data or second SL PRS configuration data;
means for transferring, with the second user equipment using the sidelink connection, one or more sidelink positioning reference signals in accordance with the second SL PRS-related data; and
means for transmitting, to the second user equipment, a request for the second SL PRS-related data, wherein the request for the second SL PRS-related data includes an indication of a value of a sidelink positioning reference signal configuration parameter.

10. The first user equipment of claim 9, further comprising means for receiving, from at least one of a base station or a server, third SL PRS-related data.

11. The first user equipment of claim 10, further comprising means for applying a priority rule to select between a first value of the second SL PRS-related data and a second value of the third SL PRS-related data in response to the first value and the second value being for a single sidelink positioning reference signal configuration parameter.

12. The first user equipment of claim 11, wherein the priority rule is based on an operational mode of the first user equipment.

13. The first user equipment of claim 9, further comprising:
means for receiving, from at least one of a base station or the second user equipment, one or more indications of a plurality of reference signal sources, and
means for selecting a particular reference signal source of the plurality of reference signal sources.

14. The first user equipment of claim 9, wherein the means for transferring the sidelink information comprise means for transmitting, to the second user equipment, first SL PRS-related data including at least one of first SL PRS assistance data or first SL PRS configuration data.

15. The first user equipment of claim 14, wherein the first SL PRS-related data includes an indication of a reference signal source for determining reference signal time difference by the second user equipment.

16. The first user equipment of claim 14, wherein the first SL PRS-related data includes at least one of: one or more quasi co-location parameter values; one or more indications of an expected reference signal time difference window; a positioning reference signal transmission pattern; or a positioning reference signal muting pattern.

17. A method for obtaining one or more positioning reference signals, the method comprising:
establishing, by a first user equipment, a sidelink connection with a second user equipment;
transferring, using the sidelink connection, sidelink information between the first user equipment and the second user equipment, the transferring the sidelink information comprising
receiving, by the first user equipment from the second user equipment, second SL PRS-related data (sidelink positioning reference signal related data) including at least one of second SL PRS assistance data or second SL PRS configuration data;
transferring, between the first user equipment and the second user equipment using the sidelink connection, one or more sidelink positioning reference signals in accordance with the second SL PRS-related data; and
transmitting, from the first user equipment to the second user equipment, a request for the second SL PRS-related data, wherein the request for the second SL PRS-related data includes an indication of a value of a sidelink positioning reference signal configuration parameter.

18. The method of claim 17, method further comprising receiving, by the first user equipment from at least one of a base station or a server, third SL PRS-related data.

19. The method of claim 18, further comprising applying a priority rule to select between a first value of the second SL PRS-related data and a second value of the third SL PRS-related data in response to the first value and the second value being for a single sidelink positioning reference signal configuration parameter.

20. The method of claim 19, wherein the priority rule is based on an operational mode of the first user equipment.

21. The method of claim 17, further comprising:
receiving, by the first user equipment from at least one of a base station or the second user equipment, one or more indications of a plurality of reference signal sources, and
selecting, by the first user equipment, a particular reference signal source of the plurality of reference signal sources.

22. The method of claim 17, wherein the transferring the sidelink information comprises transmitting, from the first user equipment to the second user equipment, first SL PRS-related data including at least one of first SL PRS assistance data or first SL PRS configuration data.

23. The method of claim 22, wherein the first SL PRS-related data includes an indication of a reference signal source for determining reference signal time difference by the second user equipment.

24. The method of claim 23, wherein the indication of the reference signal source indicates a third user equipment as the reference signal source.

25. The method of claim 22, wherein the first SL PRS-related data includes at least one of: one or more quasi co-location parameter values; one or more indications of an expected reference signal time difference window; a positioning reference signal transmission pattern; or a positioning reference signal muting pattern.

26. A non-transitory, processor-readable storage medium comprising processor-readable instructions configured to cause a processor of a first user equipment, to obtain one or more positioning reference signals, to:
  establish a sidelink connection with a second user equipment;
  transfer, using the sidelink connection, sidelink information with the second user equipment to
    receive, from the second user equipment, second SL PRS-related data (sidelink positioning reference signal related data) including at least one of second SL PRS assistance data or second SL PRS configuration data;
  transfer, with the second user equipment using the sidelink connection, one or more sidelink positioning reference signals in accordance with the second SL PRS-related data; and
  transmit, to the second user equipment, a request for the second SL PRS-related data, wherein the request for the second SL PRS-related data includes an indication of a value of a sidelink positioning reference signal configuration parameter.

27. The storage medium of claim 26, further comprising processor-readable instructions configured to cause the processor to receive, from at least one of a base station or a server, third SL PRS-related data.

28. The storage medium of claim 27, further comprising processor-readable instructions configured to cause the processor to apply a priority rule to select between a first value of the second SL PRS-related data and a second value of the third SL PRS-related data in response to the first value and the second value being for a single sidelink positioning reference signal configuration parameter.

29. The storage medium of claim 28, wherein the priority rule is based on an operational mode of the first user equipment.

30. The storage medium of claim 26, further comprising processor-readable instructions configured to cause the processor to:
  receive, from at least one of a base station or the second user equipment, one or more indications of a plurality of reference signal sources, and
  select a particular reference signal source of the plurality of reference signal sources.

31. The storage medium of claim 26, wherein the processor-readable instructions configured to cause the processor to transfer the sidelink information comprise processor-readable instructions configured to cause the processor to transmit, to the second user equipment, first SL PRS-related data including at least one of first SL PRS assistance data or first SL PRS configuration data.

32. The storage medium of claim 31, wherein the first SL PRS-related data includes an indication of a reference signal source for determining reference signal time difference by the second user equipment.

33. The storage medium of claim 31, wherein the first SL PRS-related data includes at least one of: one or more quasi co-location parameter values; one or more indications of an expected reference signal time difference window; a positioning reference signal transmission pattern; or a positioning reference signal muting pattern.

* * * * *